United States Patent [19]

Santurri et al.

[11] 3,936,560
[45] Feb. 3, 1976

[54] SELF-SEALABLE CORROSION PROTECTABLE PACKAGING MATERIAL AND METHOD OF MAKING

[75] Inventors: Pasco R. Santurri, Ballwin; Howard W. Mumm, St. Louis County; Thomas E. Yockey, Florissant, all of Mo.

[73] Assignee: The Orchard Corporation of America, St. Louis, Mo.

[22] Filed: Feb. 22, 1974

[21] Appl. No.: 444,906

[52] U.S. Cl. ............... 428/219; 21/2.5 B; 106/14; 252/390; 427/207; 427/384; 427/385; 427/401; 427/407; 428/35; 428/220; 428/424; 428/474; 428/480; 428/483; 428/492; 428/515; 428/516
[51] Int. Cl.² ......................................... C23F 15/00
[58] Field of Search ..... 117/76 P, 163, 76 F, 122 P; 21/2.5 B; 106/14; 252/390; 427/207, 384, 385, 401, 407; 428/35, 480, 483, 516, 220, 219

[56] References Cited
UNITED STATES PATENTS

| | | |
|---|---|---|
| 2,521,311 | 9/1950 | Schwoegler et al. ............... 21/2.5 B |
| 2,688,570 | 9/1954 | Wooding ............................ 117/80 X |
| 2,717,843 | 9/1955 | Wachter et al. ................. 21/2.5 B X |
| 2,739,872 | 3/1956 | Senkus ............................... 21/2.5 B |
| 2,895,270 | 7/1959 | Blaess ............................. 21/2.5 B X |
| 3,132,041 | 5/1964 | Pihl .................................... 117/76 P |
| 3,149,997 | 9/1964 | Tamburro ......................... 117/80 X |
| 3,357,841 | 12/1967 | Chari et al. ............................ 106/14 |
| 3,410,717 | 11/1968 | Hirsch ............................... 117/122 P |

*Primary Examiner*—Ralph Husack
*Attorney, Agent, or Firm*—Ralph W. Kalish

[57] ABSTRACT

Packaging material for ferrous metal parts and the like which comprises a substrate of paper stock, transparent film or foil, and having applied thereon a coating comprehending a vapor phase corrosion inhibitor of the nitrite-amide type, and a self-sealable adhesive as from the natural and synthetic latices. The proportion of the inhibitor to the latices in the coating is in the range from 5 to 25 percent by weight depending upon the characteristics of the substrate.

15 Claims, No Drawings

SELF-SEALABLE CORROSION PROTECTABLE PACKAGING MATERIAL AND METHOD OF MAKING

BACKGROUND AND SUMMARY OF THE INVENTION

This invention relates in general to packaging material and, more particularly, to self-sealable packaging material adapted for providing a corrosion inhibiting environment for metal parts.

Heretofore, there have been developed various vapor phase corrosion inhibitors used with packaging materials, such as, kraft paper and the like for protecting contained metal parts, such as, for instance, machine parts useful in the automotive industry, or other such parts constituting customary hardware items and provided in small packages as for retail merchandising. Corrosion inhibiting compositions of such type are set forth in U.S. Pat. No. 2,521,311. However, the problems of effecting a reliable closure for packages containing such inhibitors has been a continuing one. The development of a packaging material containing a corrosion inhibitor which is heat sealable has been attempted. However, despite the fact that such material might be amenable to automatic packaging, the same has proved relatively costly, as well as time consuming. The companion sheets must be first aligned and then subjected to an elevated temperature for activation of the adhesive and with the application of pressure over the activated area for a prescribed time period. Consequently, requisite equipment is required for effecting such sealing, as well as the necessary time interval which tends to slow production.

Prior to the present invention there has been no successful effort to develop a packaging material which is adapted to provide appropriate corrosion inhibition while being cold sealable or self-sealable.

Therefore, it is an object of the present ivention to provide a packaging material for ferrous metal parts readily formable into a pouch and adapted to provide a vapor phase corrosion inhibiting environment within the pouch while being self-sealable.

It is another object of the present invention to provide a packaging material of the character stated which may be stored in roll form for indefinite periods against package formation, without diminution in the sealing and corrosion protecting properties and without adherence between the roll layers.

It is a further object of the present invention to provide a package material of the character stated which conduces to the automatic formation of a pouch-like container, and the closure thereof, without the application of heat so that costly equipment is not needed for sealing.

It is another object of the present invention to provide a coating for a multiplicity of substrates to adapt same for corrosion inhibition and self-sealing which may be most economically prepared under normal atmospheric conditions and which coating may be applied to a substrate by currently available equipment.

It is a still further object of the present invention to provide a coating of the type stated which is homogeneous and which is economically prepared.

It is another object of the present invention to provide a packaging material of the character stated which is amenable to high volume, lost cost preparation and fabrication therefrom of pouch-like containers; which material is retentive of its corrosion inhibition properties for indefinite periods and with the cold seal being markedly tenacious and resistant to parting during customary usage.

DESCRIPTION OF THE INVENTION

In essence, the packaging material of the present invention comprises a substrate of flexible sheet material which may be of paper stock, a transparent synthetic film or a metal foil adapted for formation into small envelope or pouch-like containers. Provided on such substrate is a coating which contains a mixture, within predetermined proportionalities, of a natural or synthetic latex adapted for cold or self-sealing and a volatile corrosion inhibitor, dispersed throughout the latex. Ferrous metal parts are disposed within the pouch or envelope developed by the packaging material and thus are protected by the environment developed by the corrosion inhibitor. The envelope is readily closed simply by the application of pressure under atmospheric conditions for sealing purposes. The coating may be applied to the sheet material by well known conventional means and the same is non-tacky to permit of storage of the material in roll form pending envelope or pouch manufacture. Thus, by the practice of the present invention, there is only required a single step for applying to the packaging material the corrosion inhibitor and the sealing agent and by use of such material, there is obviated the need for costly equipment as required for effecting bonding under heat.

The substrate from which the present packaging material may be developed comprehend paper stock, such as kraft paper, sulfite paper, and rag paper; transparent films, such as, polyolefin, polybutylene, polyethylene, polycarbonate, polypropylene, polystyrene, cellophane, Mylar*, Surlyn A**, and foils. It is requisite that the particular substrate selected have certain critical physical properties to assure of desired performance after envelope or pouch formation. These properties include a low moisture vapor transfer rate (MVTR) for denying transmission of ambient moisture and thus markedly reduce a corrosive condition within the pouch. Associated with the moisture vapor transfer rate is the thickness of the substrate for effectively shielding against moisture transmission. It has been discovered in conjunction with the present invention that the moisture vapor transfer rate should be within the range of .1 to 1.0 gms/100 sq. in./24 hrs./atm/mil and the thickness within a range of 1 to 25 mils. The foregoing range comprehends the totality of substrate types. However, within the paper category the thicknesses should be as follows:

| | |
|---|---|
| Kraft Paper | 3 to 20 mils. |
| Sulfite Paper | 3 to 25 mils. |
| Rag Paper | 3 to 15 mils. |

*MYLAR is a trademark for a film of polyethylene terephthalate resin.
**SURLYN A is a trademark of DuPont for a film of the polyolefin type.

The foil substrates which have the best barrier properties, that is, preventing penetration of water vapor, are useful with a thickness in the range of ¼ to 2 mils. Within the film group, the following are exemplary:

| | |
|---|---|
| Polyolefin | 1 to 10 mils. |
| Polyesters | ½ to 3 mils. |
| Cellophanes | ½ to 2 mils. |

The bursting strength of the substrate should be high so that the same is not punctured during usage by sharp portions of the contained parts. This property may be determined by a recognized test and designated the Mullen strength of the substrate which, in the present instance, should be within the range of 20 to 100 psi. The tear strength of the substrates must be at levels deterent to any ripping or tearing that could accidentally occur during handling of the finished pouch. In this connection the tear strength, MD, should be within the range of 30 to 200 elmendorf grams and the tear strength, CD, should desirably be within the range of 45 to 350 elmendorf grams.

In the event an olefin film constitutes the substrate it is desirable that the same be subjected to Corona treatment which oxidizes the film surface through impingement of ionized gas molecules, thereby rendering the film increasedly receptive to the self-sealable latex coatings of the present invention. Such treatment should be within the range of 40 to 55 dynes.

The foregoing thus describes the relatively wide range of substrates which may be utilized with the present invention, and with said substrates having physical properties which render any packages, envelopes, pouches or the like formed from sheets thereof to be peculiarly adapted for durability, for reliability, as well as providing a support or carrier for the unique coating to be applied thereon, as will be developed hereinbelow.

Applied to one surface of the substrate which is normally in roll form, is a coating which incorporates a corrosion vapor phase inhibitor for protecting ferrous metals, and a self-sealable latex. Such coating is of homogeneous character and contains the aforesaid ingredients within a predetermined proportionality range to assure of integrity of such coating for extended periods of time without diminution in the requisite properties. The self-sealable agent incorporated in the coating may be a natural or a synthetic latex, such as natural rubber, butadiene/styrene rubber, butadiene/acrylonitrile rubber, chloroprene rubber, isobutylene rubber. The selected latex is emulsified preparatory to intermixture with the corrosion inhibitor.

The inhibitor is a composition of an organic amide and a nitrite which may be organic or inorganic. The nitrites include the alkali metal nitrites, such as, sodium nitrite, potassium nitrite, and lithium nitrite, as well as other inorganic nitrites including calcium nitrite, barium nitrite magnesium nitrite, aluminum nitrite, and ammonium nitrite. Among the organic nitrites which may be structurally aliphatic, aromatic, or heterocyclic are morpholine nitrite, trimethylamine nitrite, tricyclohexylamine nitrite, tribenzylamine nitrite, disopropyl ammonium nitrite, dimethyamino ethanol nitrite, di iso butyl nitrite, 2, 2-dimethyl-5, 5 diethyl-6-propyl-tetra hydro 1, 4-oxazine nitrite, 2, 3-dimethyltetra hydro-1, 4-oxazine nitrite, 2-methyltetra hydro-1, 3-oxazine nitrite, 5-n-propyltetra hydro-1, 3-oxazine nitrite, triethylammonium nitrite.

Organic amides which are useful with the present invention are also water soluble and being preferably mono-amide, diamides, and triamides and of aliphatic character. Included within this category are urea, propionamide, allyl urea, acetamide, propyl carbamate, butyramide, dimethyl urea, guanidine, stearamide, N-butyl urea.

The selected nitrite and amide for forming the vapor phase inhibitor component of the present coating are interreacted within relative proportional ranges by weight depending upon the particular nitrite and amide selected. Thus, generally, the proportions may vary between 50 parts by weight nitrite to 1 part by weight amide, and 1 part by weight nitrite to 10 parts by weight amide. The following are merely examples of the infinite potential for nitrite-amide combinations to constitute the inhibitor of the present coating:

| | |
|---|---|
| 1 Part Aluminum Nitrite By Weight | 1 Part Urea By Weight |
| 25 Parts Calcium Nitrite By Weight | 1 Part Proprionamide By Weight |
| 50 Parts Sodium Nitrite By Weight | 1 Part Allyl Urea By Weight |
| 1 Part Sodium Nitrite By Weight | 5 Parts Acetamide By Weight |
| 1 Part Magnesium Nitrite By Weight | 10 Parts Dimethyl Urea By Weight |

Other formulations are well known in the art.

The resultant inhibitor possesses a vapor pressure within the range of 0.005 mm. to 10 mm. mercury.

To facilitate addition of the nitrite-amide inhibitor to the emulsion of the preferred latex, the same is placed in water solution or within an aqueous slurry. The solution or slurry, as the case may be, is then intermixed with the latex emulsion under normal room conditions and with suitable mechanical means for achieving the desired homogeneity of the resultant fluid mass which constitutes the coating. Such coating may then be applied to the particular substrate by conventional methods, including flexographic, gravure, air knife, and curtain coating. The applied coating is non-tacky so that the now coated substrate may be returned to roll form and stored in such condition as against fabrication without diminution in properties.

In order to provide corrosion protection for a period of three months to a year or more, the total volatile corrosion inhibitor chemical combination within the resultant coating should comprise by weight a range of .1 to .5 gram per sq. ft. of the area of the substrate. The specific amount will, understandably, be determined by the character of the substrate since the more complete the barrier provided by the substrate the lesser amount of inhibitor required. For example, since foils are the most complete barriers, the relatively lowest amount of inhibitor would be required within a coating for such substrate. Transparent films would require an increased amount of inhibitor within the particular coating, while papers would require amounts at the upper end of the range since the barrier qualities of the latter are least. But, the said amount demonstrates that the coating would contain between 5 to 25 percent by weight of the vapor phase corrosion inhibitor component to the weight of the latex component. This particular relationship may be demonstrated by the following. With paper substrates, which are admittedly relatively porous, for a coating having a dry weight of 12 to 15 pounds per ream, approximately 25 percent of such coating would be constituted of the corrosion inhibitor and approximately 75 percent of the latex (dry). With transparent film substrates, a coating having a dry weight of between 1½ to 9 pounds per ream would be approximately 10 percent by weight of the inhibitor and 90 percent of the latex (dry). In the case of foil substrates, such as, for example, aluminum, a coating having a dry weight of 2 to 4 pounds per ream would be constituted of approximately 5 percent of the inhibitor and approximately 95 percent of the latex (dry).

From the foregoing it will be readily discerned that both the constitution of the coating, as well as the amounts thereof, are functions of the barrier characteristics of the particular substrate. The more effective the barrier the less amount of inhibitor is required in the coating, and the less the overall coating may be. These foregoing examples also demonstrate the range of the total coating by weight to the substrate namely from 2 to 15 pounds (dry weight) per ream.

The following are examples of coating compositions as used upon the substrate types:

EXAMPLE I

On a substrate as from kraft, sulfite, or rag paper:
1 Part By Weight Potassium Nitrite
2 Parts By Weight Acetamide
12 Parts By Weight Acrylonitrile Rubber (Dry Basis)

EXAMPLE II

On a transparent film substrate such as polyethylene, the coating may comprise:
5.0 Parts By Weight Sodium Nitrite
0.1 Part By Weight Allyl Urea
46.0 Parts By Weight Natural Rubber (Dry Basis)

EXAMPLE III

Upon foil substrates, such as aluminum, the coating may comprise:
1 Part By Weight Magnesium Nitrite
10 Parts By Weight Dimethyl Urea
209 Parts By Weight Butadiene Rubber (Dry Basis)

The foregoing examples are but illustrative of the infinite compositions of the coatings of the present invention within the above discussed ranges with respect to the selected substrate.

The particular thickness of the coating will manifestly depend upon the characteristics of the substrate. With a heavier weight per ream the coating will, understandably, be thicker than with a lesser weight per ream. Accordingly, with foils the coating will have a thickness in the neighborhood of one-half mil; while with transparent films a thickness of about 1 mil; and with paper substrates the thickness will be in the neighborhood of one-half mil.

As indicated above, the coated material is suitably withdrawn from the particular rolls and subjected to forming processes for developing a envelope-like container or pouch for accepting ferrous metal parts. The inhibitor in its vapor phase dispersed itself about such parts or other contents of the package and protects same from corrosive effects of any water vapor or oxygen. The protected atmosphere thus developed is sealed from the external air by the simple act of applying limited pressure to confronting coated portions of the envelope which becomes self-sealable. The envelopes or pouches are quickly and economically sealed without resort to costly heating equipment and time consumption as required with heat sealable containers heretofore known. The peculiar relationship, proportionality wise, between the nitrite-amide inhibitor and the latex effects a combination which has heretofore eluded the industry to the present time since all efforts to develop a coating which permiteed self-sealing while providing a vapor phase corrosion inhibitor have been unsuccessful. Furthermore, it is apparent from the foregoing that the present invention is adapted for utilization with substrates of all types although the transparent films have proved most desirable commercially.

Although the coating of the present invention may be applied directly upon the substrate, a so-called tie or prime coating may be applied before the main coating. Such prime coating is not absolutely essential although in some instances it does conduce to binding the self-sealable corrosion inhibitor coating in enhanced secure condition upon the substrate adding to the seal strength, as well as increasing the moisture vapor transfer rate of the particular substrate. Such prime coating can be applied by the conventional flexographic or gravure coating methods. Such prime coatings are more effective when applied in a relatively low weight range upon transparent films and foils, keeping migration possibilities to a minimum, and in a somewhat higher rate range upon paper substrates. The following table sets forth the resins useful for providing such a prime coating as well as the weight ranges of the same for the different substates:

|  | FILMS & FOILS | PAPER SUBSTATES |
| --- | --- | --- |
| Polyvinyl acetates | 1.0 - 2/5 lbs/ream | 2.5 - 5.0 lbs/ream |
| Polyesters | 0.5 - 2.0 lbs/ream | 1.5 - 3.5 lbs/ream |
| Polyamides | 0.2 - 1.0 lbs/ream | 1.0 - 2.5 lbs/ream |
| Urethanes | 0.2 - 1.0 lbs/ream | 1.0 - 2.5 lbs/ream |
| Acrylics | 0.75- 2.0 lbs/ream | 2.5 - 4.0 lbs/ream |
| Urea Formaldehydes | 1.0 - 2.5 lbs/ream | 2.5 - 5.0 lbs/ream |

However, as pointed out, such prime coating has been found to be a matter of choice since the main coating of the present invention achieves its purposes in a reliable efficacious manner whether or not a prime coating has been provided.

Having described our invention what we claim and desire to obtain by Letters Patent is:

1. A packaging material providing sealed containers for ferrous metal articles comprising a flexible transparent film substrate from the class consisting of polybutylene, polyethylene, polypropylene, polystyrene, and polyethylene terephthalate, said container having first and second confronting surface portions for mutual adherence when said container is closed, a homogeneous coating provided upon said substrate including said confronting first and second surface portions, said coating comprising between 5 to 25% by weight of a water soluble aliphatic nitrite-amide composition and approximately 75 to 95% by weight of a dried latex, said amide composition being from the class consisting of propionamide, allyl urea, acetamide, propyl carbamate, butyramide, dimethyl urea, guanidine, stearamide, and N-butyl urea.

2. A packaging material as defined in claim 1 wherein the latex is from the group consisting of natural and synthetic latices.

3. A packaging material as defined in claim 2 and further characterized by said coating having a thickness within the range of approximately ½ to 1½ mils.

4. A packaging material as defined in claim 3 and further characterized by said coating being within the range of 2 to 15 pounds per ream of substrate.

5. A packaging material as defined in claim 1 and further characterized by the nitrites and amides of said nitrite-amide composition being water soluble, and such composition having a vapor pressure within the range of 0.005 to 10 mm mercury.

6. A packaging material as defined in claim 1 and further characterized by said latex being from the class consisting of natural rubber, butadiene/styrene rubber, butadiene/acrylonitrile rubber, chloroprene rubber, and isobutylene rubber.

7. A packaging material as defined in claim 1 and further characterized by said coating having a thickness of approximately 1 mil and a weight of approximately 7.5 to 9.0 pounds per ream.

8. A packaging material as defined in claim 1 and further characterized by a prime coating being provided on said flexible substrate, and said homogeneous coating being provided upon said prime coating.

9. A packaging material as defined in claim 8 and further characterized by said prime coating being from the class consisting of polyvinyl acetates, polyesters, polyamides, urethanes, acrylics, and urea formaldehydes.

10. A packaging material as defined in claim 9 and further characterized by said prime coating having a weight within the range of approximately 0.2 to 5.0 pounds per ream.

11. A packaging material as defined in claim 9 and further characterized by said substrate being from the class consisting of transparent films, and said prime coating having a weight within the range of 0.2 to 2.5 pounds per ream.

12. The method of providing a packaging material for developing closures for ferrous metal parts comprising providing a substrate from the class consisting of transparent films, providing a water soluble aliphatic nitrite-amide solution, providing a latex emulsion, intermixing said nitrite-amide solution in said latex emulsion, and then applying said nitrite-amide-latex mixture in a coating upon confronting portions of said substrate under atmospheric conditions, permitting the coating to dry to provide a cohesive bond for said confronting substrate portions, and then forming said substrate into a pouch for cold sealing.

13. The method as defined in claim 12 and further characterized by said latex being a natural or a synthetic-latex and said coating being applied in a thickness of between approximately ½ to 1½ mils, and with a weight of between approximately 2 to 15 pounds per ream of substrate.

14. The method as defined in claim 13 and further characterized by providing a prime coating from the class consisting of polyvinyl acetates, polyesters, polyamides, urethanes, acrylics, urea formaldehydes, applying said prime coating upon the substrate, and then applying said coating upon said prime coating.

15. The method as defined in claim 14 and further characterized by said prime coating having a weight of between approximately 0.2 to approximately 5.0 pounds per ream of substrate.

* * * * *